United States Patent
Hart

(10) Patent No.: US 9,300,239 B2
(45) Date of Patent: Mar. 29, 2016

(54) ROTOR CONTROL

(71) Applicant: Control Techniques Limited, Newtown (GB)

(72) Inventor: Simon David Hart, Welshpool (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 355 days.

(21) Appl. No.: 14/063,532

(22) Filed: Oct. 25, 2013

(65) Prior Publication Data

US 2014/0117905 A1    May 1, 2014

(30) Foreign Application Priority Data

Oct. 26, 2012  (GB) .................................. 1219291.0

(51) Int. Cl.
| | |
|---|---|
| *H02P 6/00* | (2006.01) |
| *H02P 21/00* | (2006.01) |
| *H02P 7/00* | (2006.01) |
| *H02P 25/02* | (2006.01) |
| *H02P 23/00* | (2006.01) |

(52) U.S. Cl.
CPC .......... *H02P 25/022* (2013.01); *H02P 23/0063* (2013.01)

(58) Field of Classification Search
CPC ......... H02P 25/022; H02P 6/08; H02P 6/001; H02K 29/00
USPC ................... 318/400.42, 400.02, 400.04, 434
See application file for complete search history.

(56) References Cited

U.S. PATENT DOCUMENTS

| | | | | |
|---|---|---|---|---|
| 5,479,081 A * | 12/1995 | Seibel ..................... | H02P 21/00 318/432 |
| 5,569,994 A | 10/1996 | Taylor et al. | |
| 5,923,144 A * | 7/1999 | Seibel ................... | H02P 21/146 318/805 |
| 6,025,666 A * | 2/2000 | Kliman .................. | H02K 1/278 310/156.53 |
| 6,320,350 B1 * | 11/2001 | Take ..................... | H02K 57/003 318/114 |
| 8,384,323 B2 | 2/2013 | Akiyama | |
| 2003/0184179 A1 * | 10/2003 | Galbraith ............... | H02K 39/00 310/166 |
| 2013/0033254 A1 * | 2/2013 | Shinnaka ............. | H02P 21/0042 324/160 |

* cited by examiner

*Primary Examiner* — Bentsu Ro
*Assistant Examiner* — Gabriel Agared
(74) *Attorney, Agent, or Firm* — Harness, Dickey & Pierce, P.L.C.

(57) ABSTRACT

A method arranged to control a motor for driving a load is disclosed. The motor and load form at least a part of a system and the motor comprises a stator arranged to produce a varying magnetic field responsive to an applied AC voltage and a rotor arranged to rotate responsive to the varying magnetic field produced by the stator, the rotor rotating at a speed synchronized to a frequency of the applied AC voltage. The method comprises receiving a target rotor speed, determining a voltage level for the applied AC voltage for producing a magnetic field having magnetic flux of sufficient magnitude to maintain the rotor in synchronization with the frequency of the applied AC voltage when rotating at the target speed of rotation. The voltage level is determined in accordance with the target rotor speed and a model of the system. The model comprising a plurality of model elements, wherein one or more of the model elements is indicative of an effect of one or more parts of the system on rotation of the rotor when the speed of the rotor is constant and one or more of the model elements are indicative of an effect of one or more parts of the system on rotation of the rotor when the speed of the rotor is dynamic. The method further comprising applying the applied AC voltage to the stator at the determined voltage level and at a frequency required to provide the target rotor speed.

20 Claims, 3 Drawing Sheets

ROTOR CONTROL

CROSS-REFERENCE TO RELATED APPLICATION

This application claims the benefit and priority of Great Britain Patent Application No. 1219291.0 filed Oct. 26, 2012. The entire disclosure of the above application is incorporated herein by reference.

FIELD OF INVENTION

This disclosure relates to a method and apparatus for controlling a rotor. More specifically, but not exclusively, a method is disclosed for controlling a speed of rotation of a rotor of a motor.

BACKGROUND TO THE INVENTION

Motors are commonly used to power the operation of a wide range of devices from very small scale machines to much larger assemblies such as elevators (also known as "lifts"). One of the most common forms of motor used, particularly in industrial applications requiring a constant motor speed, are synchronous motors. Synchronous motors synchronise the rotation of a shaft of the motor with a frequency of an AC electrical supply used to power the motor.

In general terms, a synchronous motor comprises a stator and a rotor. The stator includes a number of coils or windings through which electric currents can be fed. The rotor comprises at least one pair of permanent magnets. When an AC current is fed through a winding of the stator, the winding generates a changing magnetic field. Therefore, in a three-phase motor, when the three-phase components of a three-phase AC current are fed through three respective windings, a rotating magnetic field is created in the stator. The rotating magnetic field created in the stator causes rotation of the rotor, and the speed of rotation of the rotor is synchronous with the frequency of the three-phase AC current. The angle between the rotor and the stator produces a resultant net torque, which dictates the net rotational movement of the rotor.

In order for the net rotational movement of the rotor to be in a desired direction and at a desired speed at any given time, the net torque of the rotor must be controlled. The position and phase at which current is injected through the windings in the stator relative to the permanent magnets in the rotor will determine the configuration of the magnetic flux produced by the stator. This will affect the rotational movement imparted by the winding on the rotor, which in turn determines the net torque on the rotor, and therefore the efficiency of the motor.

It is common practice to control the motor by having various speed and position sensors to monitor the rotation of the rotor and adjust characteristics of the voltage applied to the stator in order to control the rotors rotation. However, such methods are extremely computationally expensive and require additional electronic components, which thereby increases the system manufacturing cost.

One means for efficiently controlling a motor, without using speed and position sensors, is by means of a closed current loop (CL) vector control method. Such methods employ techniques, such as signal injection, to determine the rotor shaft position. However, even though these techniques do not use speed and position sensors, they still require considerable computation and rely on high bandwidth current measurement systems.

One alternative means for controlling a motor, particularly for low dynamic motor applications (e.g. pumps and fans), is an open current loop (OL) method. In OL methods, a machine terminal voltage demand is produced based on a profile related to the required mechanical speed. While these OL methods can be implemented on lower cost hardware compared to CL methods and offer the advantage of being more computationally efficient, these methods are extremely inefficient.

SUMMARY OF INVENTION

Embodiments of the present invention attempt to mitigate at least some of the above-mentioned problems.

In accordance with an aspect of the invention there is provided a method arranged to control a motor for driving a load. The motor and load form at least a part of a system. The motor comprises a stator arranged to produce a varying magnetic field responsive to an applied AC voltage and a rotor arranged to rotate responsive to the varying magnetic field produced by the stator. The rotor rotates at a speed synchronised to a frequency of the applied AC voltage. The method comprises receiving a target rotor speed. The method also comprises determining a voltage level for the applied AC voltage for producing a magnetic field having magnetic flux of sufficient magnitude to maintain the rotor in synchronisation with the frequency of the applied AC voltage when rotating at the target speed of rotation. The voltage level is determined in accordance with the target rotor speed, and a model of the system comprising a plurality of model elements, wherein one or more of the model elements is indicative of an effect of one or more parts of the system on rotation of the rotor when the speed of the rotor is constant and one or more of the model elements are indicative of an effect of one or more parts of the system on rotation of the rotor when the speed of the rotor is dynamic. The method further comprises applying the applied AC voltage to the stator at the determined voltage level and at a frequency required to provide the target rotor speed.

The voltage level may be determined by applying the target rotor speed to the model.

The voltage level may be determined by:

$$V_T = K_1\omega^2 + K_2\omega + K_3\dot{\omega} + K_4\ddot{\omega} + K_5$$

Wherein $\omega$ is the target rotor speed, $\dot{\omega}$ is the derivative of the target rotor speed, $\ddot{\omega}$ is the derivative of the derivative of the target rotor speed, $K_1$ is a coefficient related to an effect of all parts of the system that inhibit free rotation of the rotor and vary with the square of the speed of the rotor, $K_2$ is a coefficient related to an effect of all parts of the system that inhibit free rotation of the rotor that vary with the speed of the rotor, $K_3$ is a coefficient related to the effect of all parts of the system that inhibit free rotation of the rotor that vary with the rate of change of the speed of the rotor, $K_4$ is a coefficient related to the effect of all parts of the system that inhibit free rotation of the rotor that vary with the rate of change of the rate of change of speed of the rotor, and $K_5$ is the coefficient related to the effect of all the constants that inhibit free rotation of the rotor including the stiction.

The voltage may be determined, when the system is operating at a constant speed, by:

$$V_{T(constant\ speed)} = K_1\omega^2 + K_2\omega + K_5$$

wherein $\omega$ is the target rotor speed, $K_1$ is a coefficient related to an effect of all parts of the system that inhibit free rotation of the rotor and vary with the square of the speed of the rotor, $K_2$ is a coefficient related to an effect of all parts of the system that inhibit free rotation of the rotor that vary with the speed of the rotor, and $K_5$ is the coefficient related to the effect of all the constants that inhibit free rotation of the rotor including the stiction.

The voltage may be determined, when the system is operating at a dynamic speed, by:

$$V_{T(dynamic\ speed)} = K_3 \dot{\omega} + K_4 \ddot{\omega}$$

Wherein $\dot{\omega}$ is the derivative of the target rotor speed, $\ddot{\omega}$ is the derivative of the derivative of the target rotor speed, $K_3$ is a coefficient related to the effect of all parts of the system that inhibit free rotation of the rotor that vary with the rate of change of the speed of the rotor, and $K_4$ is a coefficient related to the effect of all parts of the system that inhibit free rotation of the rotor that vary with the rate of change of the rate of change of speed of the rotor.

The coefficients, $K_n$, of the model may be selected by a user.

The model may be arranged to balance maximisation of motor efficiency with reduction of a risk of motor de-synchronisation.

The speed of the rotor may be dynamic when the target speed is greater than or less than a current speed of the rotor.

The voltage level may be increased by an additional amount when the target speed is greater than the current speed of the rotor.

The method may further comprise changing the frequency of the applied AC voltage to the frequency required to provide the target rotor speed after applying the applied AC voltage at the determined voltage level.

The method may be an open loop motor control method.

In accordance with another aspect of the invention there is provided an apparatus for controlling a motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage. The apparatus comprises a processor arranged to perform any of the motor control methods described herein.

In accordance with yet another aspect of the invention there is provided a system, comprising a motor. The motor comprises a stator arranged to produce a varying magnetic field responsive to an applied AC voltage and a rotor arranged to rotate responsive to the varying magnetic field produced by the stator, the rotor rotating at a speed synchronised to a frequency of the applied AC voltage. The system also comprises an apparatus for controlling the motor as described herein. The system may further comprise a load, wherein the load is driven by the motor.

In accordance with another aspect of the invention there is provided a computer-readable medium operable, in use, to instruct a computer to perform any of the method for controlling a motor described herein.

Embodiments of the present invention provide reduced power consumption and reduced heating. In addition, embodiments of the invention are arranged to minimise the need for complex user configuration. Some embodiments of the invention provide reduced computation and signal processing for a given system efficiency.

Embodiments of the invention apply common open current loop control (OL) usually used in asynchronous machines to synchronous machines including permanent magnet (PM) machines. Such embodiments provide simple motor control. Such embodiments may also provide simple set-up.

Embodiments of the invention relate to a method that uses a simple model of the load and motor to determine the optimal voltage demand given a constant output frequency (or speed) demand. Before any dynamic change in output frequency (speed) is applied, the voltage output may be modified as prescribed by the simple model of the load and the motor. The final voltage output is a balance between efficiency and robustness against losing synchronisation.

In embodiments of the invention, for a given load dynamic speed profile, the system can be tuned to be more efficient than the standard open loop voltage demand methods as the demand terminal voltage is set based on the constant speed condition and then increased to compensate only when dynamic speed behaviour is to be experienced.

Embodiments of the invention can be extended to provide low speed/torque control and then transfer to a closed current loop field orientated vector method once the machine is rotating.

Embodiments of the invention can be utilised with other types of synchronous machines and load models, not just those described herein.

Embodiments of the invention aim to maximise system efficiency by reducing the voltage demand during lower load torque conditions.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
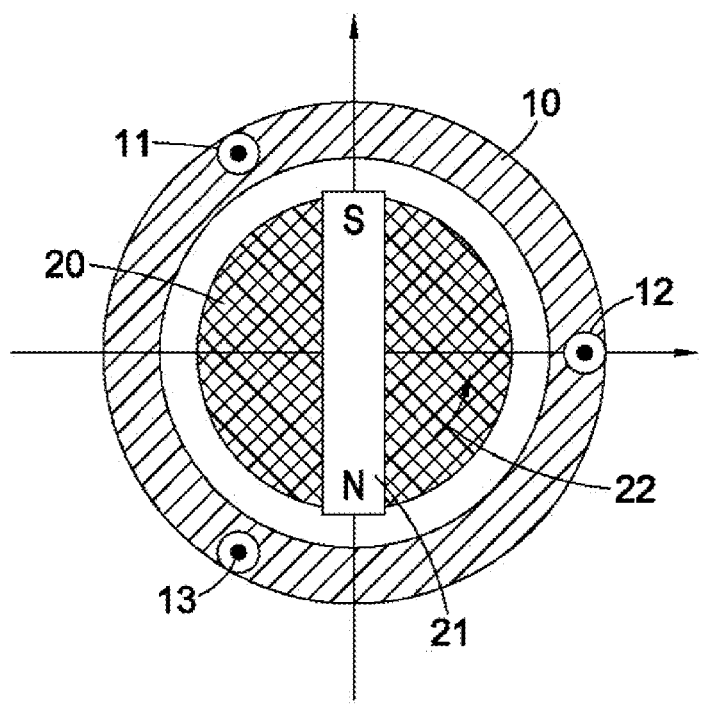
FIG. 1 illustrates a synchronous motor.

FIG. 1 illustrates a motor arrangement comprising a stator 10 and a rotor 20. The stator 20 and rotor 10 are circular in shape and concentric with one another, the rotor 10 being arranged within the stator 20.

The stator 10 comprises three sets of windings 11, 12, 13 equidistantly spread around the circumference of the stator 10. Each winding is arranged to have one phase of a balanced three-phase current passed therethrough, wherein each of the phase components are provided with a current of equal magnitude and separated from one another in terms of phase by 120°. The phase separation of the three windings 11, 12, 13 effectively cancels out the mechanical separation to provide a sinusoidal field distribution from the stator 10.

The rotor 20 comprises a magnetic member 21 in the form of a single fixed bar magnet running from a first side of the rotor 20 to an other side of the rotor 20, the other side of the rotor being on an opposite side of the rotor to the first side of the rotor. The rotor is rotatable about its shaft or axis which runs longitudinally along the rotor (into the page on FIG. 1).

The sinusoidal magnetic field distribution of the stator 10 drives the rotation of the rotor 20 due to the magnetic interaction of the magnetic member 21 to the sinusoidal magnetic field distribution. The resultant rotation of the rotor 20 is illustrated by arrow 22 in FIG. 1.

The motor arrangement of FIG. 1 is arranged to drive a load, and is arranged to be controlled by a control apparatus. Together, the motor, load, and apparatus form parts of a larger overall system.

A method for controlling the motor of FIG. 1 shall now be described in detail.

This method uses an open loop methodology because of the reduced processing complexity and reduction in physical components required for implementation provided by such methods. Furthermore, the method set-out below aims to maximise the efficiency of the system by attempting to provide a torque angle as close to 90° as possible, while reducing the risk of the rotor coming out of synchronisation with the stator by maintaining the torque angle below 90°.

In order to provide such an optimised open loop control method, the present invention determines the voltage to be applied to the stator 10 in accordance with a model of the overall system. The simple mechanical model for the system is shown in Equation 1, wherein the load of the system, i.e. the sum of the parts of the whole system which inhibit free rotation of the motor, is calculated as a function of the mechanical speed of the rotor shaft, ω.

$$T_{load} = K_6\omega^2 + K_7\omega + K_8\dot{\omega} + K_9 \qquad \text{Equation 1}$$

where $K_6$ to $K_9$ represent system coefficients. More specifically, $K^6$ is a weighting applied to the square of the speed and the term $K^6\omega^2$ represents a windage applied to the load, in other words the effects of movement of the load through a fluid such as air, $K^7$ is a weighting applied to the speed and $K^7\omega$ represents the frictional losses of the load, $K^8$ is a weighting applied to the rate of change of the speed, and $K^8\dot{\omega}$ therefore represents the affects of inertia on the load, and $K^9$ represents the affects of stiction, which are independent of frequency.

Hence, the disturbance caused to the rotation of the motor by the affects of the system as a whole depend on features relating to "constant speed" and "dynamic speed" operation of the motor.

From Equation 2, the voltage to be applied to the stator 10 can be determined as follows:

$$V_T = K_1\omega^2 + K_2\omega + K_3\dot{\omega} + K_4\ddot{\omega} + K_5 \qquad \text{Equation 2}$$

Wherein $K_1$ is a coefficient related to an effect of all parts of the system that inhibit free rotation of the motor and vary with the square of the mechanical speed, $K_2$ is a coefficient related to an effect of all parts of the system that inhibit free rotation of the motor that vary with the mechanical speed, $K_3$ is a coefficient related to the effect of all parts of the system that inhibit free rotation of the motor that vary with the rate of change of the mechanical speed (i.e. acceleration). $K_4$ is a coefficient related to the effect of all parts of the system that inhibit free rotation of the motor that vary with the rate of change of the rate of change of mechanical speed (i.e. Jerk), and $K_5$ is the coefficient related to the effect of all the constants that inhibit free rotation of the motor including the mechanical stiction.

Equation 2 therefore selects the appropriate terminal voltage to produce a load angle and thus a torque angle that will provide enough balancing torque to satisfy the load requirements.

The parameters $K_1$ to $K_5$ are selected depending on the motor and load dynamics required. These parameters can be preset in a factory if the motor is installed with the apparatus that it is powering, or these parameters can be set for an individual machine when being set-up by a user.

The operation of the model at constant speed shall now be considered in detail.

When the speed is constant, the rate of change of the speed, and the rate of change of the rate of change of speed will be zero, which will reduce to zero the terms with coefficients $K_3$ and $K_4$ from equation 2. Consequently, at constant speed, the voltage to be applied can be determined by Equation 3, which contains only the constant speed terms:

$$V_{T(constant\ speed)} = K_1\omega^2 + K_2\omega + K_5 \qquad \text{Equation 3}$$

Figure 2:
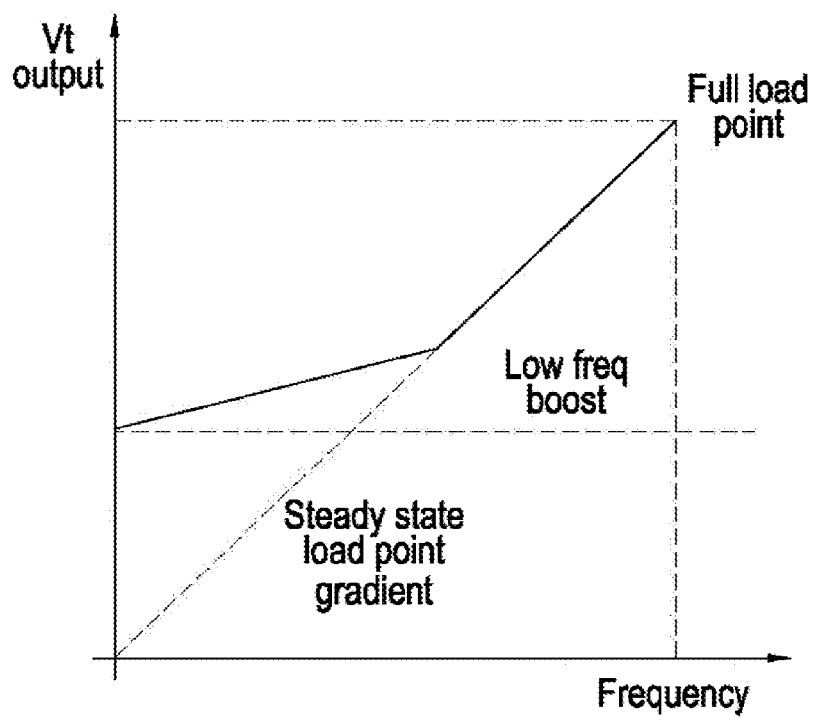
FIG. 2 illustrates a relationship between required frequency or speed and applied voltage.

The "low frequency voltage boost" is given by $K_5$. This term is provided to overcome the affects of stiction, which occurs when the rotor is starting to rotate at low speeds, as well as model and inverter offsets. $K_2$ is the gradient of the line between the zero speed/zero voltage and the "full load point", as shown in FIG. 2. This term varies linearly with mechanical speed and includes the effect of the load friction.

FIG. 2 shows the voltage demand determined by only the constant speed terms as a function of the frequency of the voltage. Since the motor is a synchronous machine, the resulting mechanical speed is an integer sub-multiple of the frequency of the voltage. The system depicted by FIG. 2 assumes that there is zero windage and therefore $K_1$ is set to zero. The voltage output shown as Vt output on the Y-axis represents the peak voltage of the sinusoidal voltage supplying the motor. The frequency shown as the x-axis is the frequency of the sinusoidal voltage supplying the motor. The voltage demand starts at the level defined by $K_5$ (shown as "Low freq boost" on the diagram). The voltage boost provided by $K_5$ is gradually reduced to zero as the frequency is increased. At the point where the effect of $K_5$ has been reduced to zero, the voltage demand curve joins the curve defined by the $K_2$ term, shown as the steady state load point gradient. From the frequency at which the effect of the $K_5$ terms has reduced to zero to the maximum frequency (shown as the "Full load point") the voltage output follows the curve defined by the $K_2$ term. If the system required a $K_5$ of zero, the entire constant speed voltage curve would follow the curve defined by the $K_2$ term. The point at which the effect of the $K_5$ term reduces to zero can be altered by the user.

At a constant speed, the values of $K_1$, $K_2$ and $K_5$ result in an applied voltage that provides a torque angle that is below 90° so that if there is a small load torque disturbance this will cause the load angle to increase towards 90° where the machine will produce more load torque for the same current. If there is a load disturbance that increases the total load torque, the resulting total load torque moves the rotor shaft back with respect to the direction of rotation which increases the load and torque angles. This increase in torque angle brings the torque angle closer to the maximum torque per amp at 90°, which in turn increases the amount of electromagnetic torque provided for the same level of current. The increase in electromagnetic torque therefore balances the torque disturbance. If the torque disturbance acts to decrease the total load torque required, the rotor will be pulled faster than the rotation and the torque angle will decrease. As the torque angle decreases, the electromagnetic torque produced decreases given a constant level of current. This therefore balances the decreased total torque demand.

In practice, the parameters are defined in order to allow for some torque disturbance, so that if there is a torque disturbance, the motor does not come out of synchronisation. The torque disturbance allowance, i.e. how far below the ideal 90° torque angle the system is set-up to operate at is a compromise with the system efficiency. Hence, the greater the torque disturbance allowance the lower the general system efficiency, but the higher the system efficiency the higher the risk of de-synchronisation.

We shall now consider the operation of the method at dynamic speed, i.e. when the motor is accelerating or decelerating.

When the speed is dynamic, only the rate of change of speed and the rate of change of rate of change of speed become of importance. However, it is noted that in order to determine the final voltage demand the dynamic speed voltage is added to the constant speed voltage. Equation 2 can therefore be re-written as shown by equation 4 of the dynamic speed compensation terms:

$$V_{T(dynamic\ speed)} = K_2\dot{\omega} + K_4\ddot{\omega} \qquad \text{Equation 4}$$

As mentioned in respect of equation 2, $K_2$ is the weighting applied to the rate of change of the rotor speed, which can be considered an "Acceleration boost" effect of the mechanical load, which is dominant, and $K_4$ is the weighting applied to the rate of change of rate of change of speed, which can be considered the "Jerk boost" effect of the mechanical load, which is dominant. In other words, the voltage determined by equation 4 compensates for the increase in load demand during changing speed due to the terms relating to the inertia and motor inductances. These weightings are user defined or auto-tuned parameters that are selected to provide an optimal, or near-optimal, level of system performance while reducing the power consumption to a minimum. The voltage determined by the dynamic speed terms is added to the voltage determined by the constant speed terms to produce the final demand voltage which will be supplied to the motor.

In accordance with equation 4, the demand terminal voltage is increases when the speed demand increases, but before the frequency of the voltage supplying the motor is changed. This delay is to permit the current in the machine to rise through the stator inductance as it is only the voltage which is controlled. This increase in current in turn decreases the torque angle. The frequency of the voltage supplying the motor can now be increased, which increases the load torque. The increase in load torque is balanced by the decrease in torque angle described. The mechanical speed is then kept constant by maintaining a constant frequency of the applied voltage and the voltage determined by the dynamic speed terms will reduce.

As the mechanical speed changes, by increasing the frequency of the applied voltage, the load torque demand increases which in turn causes the rotor, and therefore the associated field flux, to move with respect to the current. This increases the torque angle towards the maximum torque per amp point at 90°. The electromagnetic torque also increases as the torque angle increases towards 90° which balances the new load torque requirement. The "Acceleration boost" and the "Jerk boost" gains are set so that the current will not lose synchronisation with the field flux. Hence, the torque angle will never be greater than 90°.

The change in peak voltage level precedes the change in frequency to permit the current to build up to the desired level through the stator resistance and inductance. The voltage drop across the stator resistance can then be compensated for.

Figure 3:
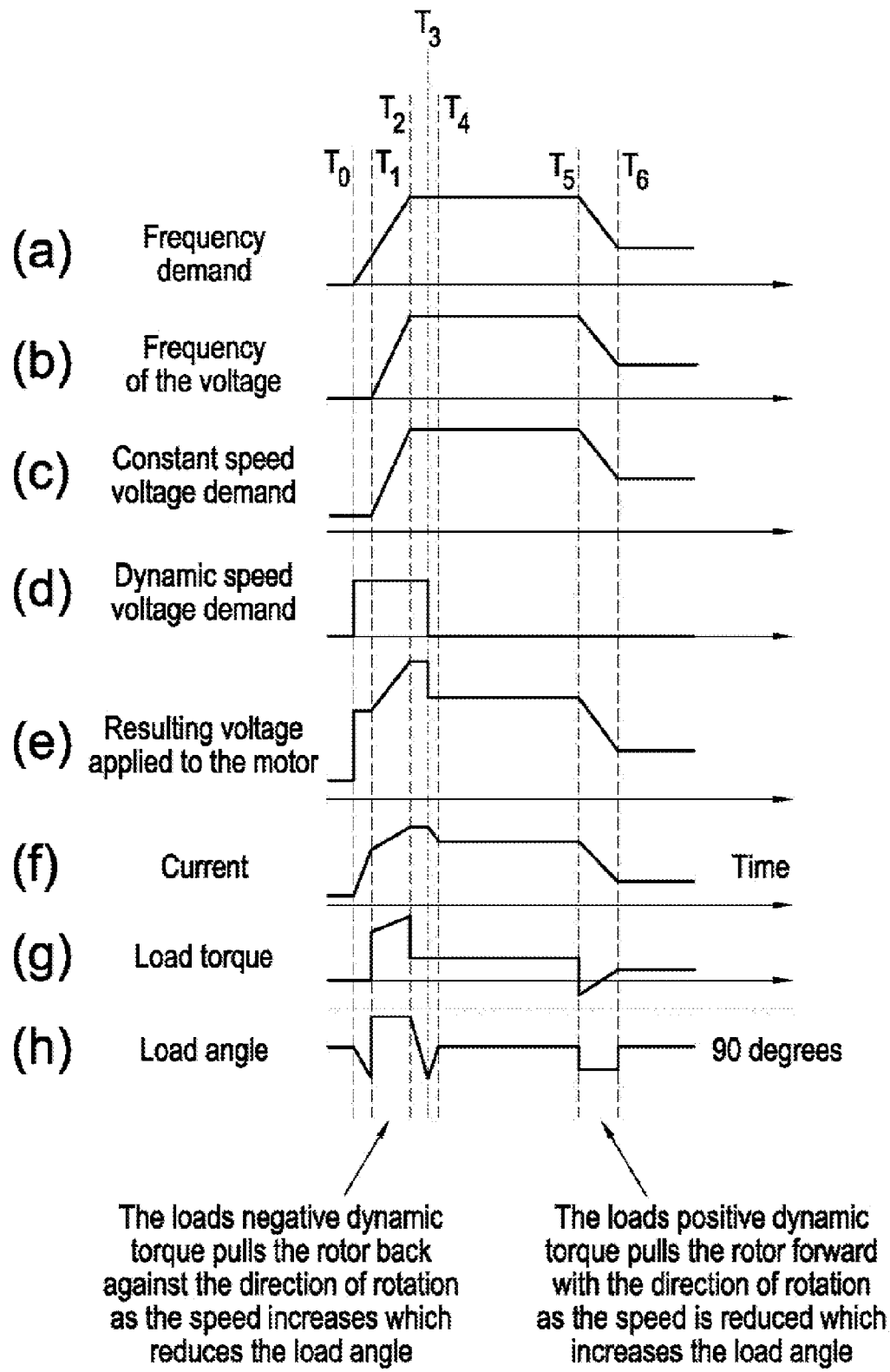
FIG. 3 illustrates various states of operation of a motor over time.

The operation of the method when moving between different states of operation, e.g. when moving between constant speed acceleration and/or deceleration, shall now be considered with reference to FIG. 3 where, plot (a) of FIG. 3 shows a frequency demand for a motor, plot (b) shows a frequency of the voltage, plot (c) shows a constant speed voltage demand, plot (d) shows a dynamic speed voltage demand, plot (e) shows a resulting voltage applied to the motor, i.e. the combination of the constant speed and dynamic speed voltage demands, (f) shows the current supplied to the stator, (g) shows load torque, and (h) shows the load angle.

At T0 the speed demand is zero and the frequency of the voltage is zero and thus the mechanical speed is zero. The voltage supplied is set by the $K_5$ term and the torque angle is below 90°. The torque demand at this point is zero.

Between T0 and T1 the speed demand increases. Before the frequency of the voltage changes, the voltage is increased as defined by the dynamic speed terms. After the short time to T1, during which the current has built up through the stator inductance, the frequency of the voltage supplying the motor is increased. The increase in current decreases the torque angle before the mechanical speed is changed. From T1 the increase in the frequency of the voltage supplying the machine in turn increases the mechanical speed of the motor. This increase in mechanical speed changes the constant speed terms which results in an increase in the voltage supplied to the motor. During the change in mechanical speed, the load demand increases, which is balanced by increasing the torque angle towards 90°.

At T2 the mechanical speed matches the speed demand and the frequency of the voltage supplying the motor becomes constant. The load angle decreases as the load torque decreases due to the absence of any dynamic speed terms. At T3 the voltage determined by the dynamic speed terms returns to zero and so the voltage supplied to the machine reduces to only the voltage determined by the constant speed terms. At T4 the voltage is determined only by the constant speed terms and the current has reduced to the level needed to provide a safe and yet efficient level to maintain the constant speed.

At T5 the speed starts to decrease. The frequency of the voltage supplying the motor decreases without delay and the voltage is determined only by the constant speed terms. The dynamic speed voltage terms are not used during speed decreases because doing so would lead to a torque angle larger than 90°, which is not stable with respect to maintaining synchronisation. The load torque reduces when the speed decreases which in turn lowers the torque angle.

At T6 the speed demand and the frequency of the voltage supplying the motor become constant once more and the load torque also becomes constant. The voltage level supplied to the motor is determined only by the constant speed terms and the current has reduced to the level needed to provide a safe and yet efficient level to maintain the constant speed.

FIG. 3 therefore shows that preceding every change in frequency away from zero demand there is a period during which the applied voltage is increased to decrease the torque angle through the resulting increase in current. This "dynamic speed" compensation is then removed once the frequency demand returns to steady state. This additional voltage level is not applied during deceleration, nor when the speed is constant. Any voltage up to the maximum operating voltage of the machine, which still allows for the machine to remain in synchronisation, can be used.

The method described above can also be used when the machine is rotating in reverse, i.e. when there is negative frequency demand. However, the dynamic speed compensation is only used when the speed is moving away from zero speed. The terminal voltage is not compensated for if the speed is decreasing because this may cause the system to lose synchronisation by driving the torque angle above 90° prior to the change in frequency.

It will be appreciated that in alternative embodiments of the invention the stator and rotor may take alternative forms. For example, the rotor may include multiple pole magnets, and the stator may include equivalent multiples of windings.

Note that embodiments of the invention could be enhanced to operate with more complex load models.

The various control methods described above may be implemented in hardware or by a computer program.

When implemented by a computer program a computer could be provided having a memory to store the computer program, and a processor to implement the computer program. The processor would then perform the control process for control of the voltage applied to the stator. The computer program may include computer code arranged to instruct a computer to perform the functions of one or more of the various methods described above. The computer program and/or the code for performing such methods may be provided to an apparatus, such as a computer, on a computer readable medium. The computer readable medium could be, for example, an electronic, magnetic, optical, electromagnetic, infrared, or semiconductor system, or a propagation medium for data transmission, for example for downloading the code over the Internet. Non-limiting examples of a physical computer readable medium include semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The invention claimed is:

1. A method arranged to control a motor for driving a load, the motor and load forming at least a part of a system, the motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the method comprising:
   receiving a target rotor speed;
   determining a voltage level for the applied AC voltage for producing a magnetic field having magnetic flux of sufficient magnitude to maintain the rotor in synchronisation with the frequency of the applied AC voltage when rotating at the target speed of rotation, wherein the voltage level is determined in accordance with:
      the target rotor speed; and
      a model of the system comprising a plurality of model elements, wherein one or more of the model elements is indicative of an effect of one or more parts of the system on rotation of the rotor when the speed of the rotor is constant and one or more of the model elements are indicative of an effect of one or more parts of the system on rotation of the rotor when the speed of the rotor is dynamic; and
   applying the applied AC voltage to the stator at the determined voltage level and at a frequency required to provide the target rotor speed,
   wherein the voltage level is determined by:

$$V_T = K_1\omega^2 + K_2\omega + K_3\dot{\omega} + K_4\ddot{\omega} + K_5$$

wherein $\omega$ is the target rotor speed, $\dot{\omega}$ is the derivative of the target rotor speed, $V_{T(dynamic\ speed)} = K_3\dot{\omega} + K_4\ddot{\omega}$ is the derivative of the derivative of the target rotor speed, $K_1$ is a coefficient related to an effect of all parts of the system that inhibit free rotation of the rotor and vary with the square of the speed of the rotor, $K_2$ is a coefficient related to an effect of all parts of the system that inhibit free rotation of the rotor that vary with the seed of the rotor, $K_3$ is a coefficient related to the effect of all parts of the system that inhibit free rotation of the rotor that vary with the rate of change of the speed of the rotor, $K_4$ is a coefficient related to the effect of all parts of the system that inhibit free rotation of the rotor that vary with the rate of change of the rate of change of speed of the rotor, and $K_5$ is the coefficient related to the effect of all the constants that inhibit free rotation of the rotor including the stiction.

2. The method according to claim 1, wherein the voltage level is determined by applying the target rotor speed to the model.

3. The method according to claim 1, wherein the voltage level is determined, when the system is operating at a constant speed, by:

$$V_{T(constant\ speed)} = K_1\omega^2 + K_2\omega + K_5$$

wherein $\omega$ is the target rotor speed, $K_1$ is a coefficient related to an effect of all parts of the system that inhibit free rotation of the rotor and vary with the square of the speed of the rotor, $K_2$ is a coefficient related to an effect of all parts of the system that inhibit free rotation of the rotor that vary with the speed of the rotor, and $K_5$ is the coefficient related to the effect of all the constants that inhibit free rotation of the rotor including the stiction.

4. The method according to claim 1, wherein the voltage level is determined, when the system is operating at a dynamic speed, by:

$$V_{T(dynamic\ speed)} = K_3\dot{\omega} + K_4\ddot{\omega}$$

wherein $\dot{\omega}$ is the derivative of the target rotor speed, $V_{T(dynamic\ speed)} = K_3\dot{\omega} + K_4\ddot{\omega}$ is the derivative of the derivative of the target rotor speed, $K_3$ is a coefficient related to the effect of all parts of the system that inhibit free rotation of the rotor that vary with the rate of change of the speed of the rotor, and $K_4$ is a coefficient related to the effect of all parts of the system that inhibit free rotation of the rotor that vary with the rate of change of the rate of change of speed of the rotor.

5. The method according to claim 1, wherein the coefficients, $K_n$, of the model are selected by a user.

6. The method according to claim 1, wherein the model is arranged to balance maximisation of motor efficiency with reduction of a risk of motor de-synchronisation.

7. The method according to claim 1, wherein the speed of the rotor is dynamic when the target speed is greater than or less than a current speed of the rotor.

8. The method according to claim 7, wherein the voltage level is increased by an additional amount when the target speed is greater than the current speed of the rotor.

9. The method according to claim 1, further comprising:
   changing the frequency of the applied AC voltage to the frequency required to provide the target rotor speed after applying the applied AC voltage at the determined voltage level.

10. The method according to claim 1, wherein the method is an open loop motor control method.

11. An apparatus for controlling a motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the apparatus comprising:
   a processor arranged to perform the method of claim 1.

12. A system, comprising:
   a motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage; and
   an apparatus according to claim 11.

13. The system according to claim 12, wherein the system further comprises a load, wherein the load is driven by the motor.

14. A Non-transitory computer-readable medium operable, in use, to instruct a computer to perform the method of claim 1.

15. A method arranged to control a motor for driving a load, the motor and load forming at least a part of a system, the motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the method comprising:

receiving a target rotor speed;

determining a voltage level for the applied AC voltage for producing a magnetic field having magnetic flux of sufficient magnitude to maintain the rotor in synchronisation with the frequency of the applied AC voltage when rotating at the target speed of rotation, wherein the voltage level is determined in accordance with:

the target rotor speed; and a model of the system comprising a plurality of model elements, wherein one or more of the model elements is indicative of an effect of one or more parts of the system on rotation of the rotor when the speed of the rotor is constant and one or more of the model elements are indicative of an effect of one or more parts of the system on rotation of the rotor when the speed of the rotor is dynamic; and applying the applied AC voltage to the stator at the determined voltage level and at a frequency required to provide the target rotor speed, wherein the voltage level is determined, when the system is operating at a constant speed, by:

$$V_{T(constant\ speed)} = K_1 \omega^2 + K_2 \omega + K_5$$

wherein w is the target rotor speed, $K_1$ is a coefficient related to an effect of all parts of the system that inhibit free rotation of the rotor and vary with the square of the speed of the rotor, $K_2$ is a coefficient related to an effect of all parts of the system that inhibit free rotation of the rotor that vary with the speed of the rotor, and $K_5$ is the coefficient related to the effect of all the constants that inhibit free rotation of the rotor including the stiction.

16. An apparatus for controlling a motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the apparatus comprising:

a processor arranged to perform the method of claim 15.

17. A Non-transitory computer-readable medium operable, in use, to instruct a computer to perform the method of claim 15.

18. A method arranged to control a motor for driving a load, the motor and load forming at least a part of a system, the motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the method comprising:

receiving a target rotor speed;

determining a voltage level for the applied AC voltage for producing a magnetic field having magnetic flux of sufficient magnitude to maintain the rotor in synchronisation with the frequency of the applied AC voltage when rotating at the target speed of rotation, wherein the voltage level is determined in accordance with:

the target rotor speed; and a model of the system comprising a plurality of model elements, wherein one or more of the model elements is indicative of an effect of one or more parts of the system on rotation of the rotor when the speed of the rotor is constant and one or more of the model elements are indicative of an effect of one or more parts of the system on rotation of the rotor when the speed of the rotor is dynamic; and applying the applied AC voltage to the stator at the determined voltage level and at a frequency required to provide the target rotor speed, wherein the voltage level is determined, when the system is operating at a dynamic speed, by:

$$V_{T(dynamic\ speed)} = K_3 \dot{\omega} + K_4 \ddot{\omega}$$

wherein $\dot{\omega}$ is the derivative of the target rotor speed, $V_{T(dynamic\ speed)} = K_3 \dot{\omega} + K_4 \ddot{\omega}$ is the derivative of the derivative of the target rotor speed, $K_3$ is a coefficient related to the effect of all parts of the system that inhibit free rotation of the rotor that vary with the rate of change of the speed of the rotor, and $K_4$ is a coefficient related to the effect of all parts of the system that inhibit free rotation of the rotor that vary with the rate of change of the rate of change of speed of the rotor.

19. An apparatus for controlling a motor comprising a stator arranged to produce a varying magnetic field responsive to an applied AC voltage and a rotor arranged to rotate responsive to the varying magnetic field produced by the stator, the rotor rotating at a speed synchronised to a frequency of the applied AC voltage, the apparatus comprising:

a processor arranged to perform the method of claim 18.

20. A non-transitory computer-readable medium operable, in use, to instruct a computer to perform the method of claim 18.

* * * * *